United States Patent
Tichborne et al.

(10) Patent No.: US 7,802,753 B2
(45) Date of Patent: Sep. 28, 2010

(54) FUEL TANK FOR AN AIRCRAFT

(75) Inventors: Franklin George Tichborne, Whitchurch (GB); Kim Michael Ley, Frampton Cotterel (GB)

(73) Assignee: Airbus UK Limited, Bristol (GB)

( * ) Notice: Subject to any disclaimer, the term of this patent is extended or adjusted under 35 U.S.C. 154(b) by 31 days.

(21) Appl. No.: 11/659,520

(22) PCT Filed: Aug. 2, 2005

(86) PCT No.: PCT/GB2005/003018

§ 371 (c)(1), (2), (4) Date: Feb. 5, 2007

(87) PCT Pub. No.: WO2006/013346

PCT Pub. Date: Feb. 9, 2006

(65) Prior Publication Data

US 2007/0187552 A1    Aug. 16, 2007

(30) Foreign Application Priority Data

Aug. 5, 2004    (GB) .................. 0417473.6

(51) Int. Cl.
*B64D 45/02*    (2006.01)
*B64D 37/32*    (2006.01)

(52) U.S. Cl. ................ 244/1 A; 244/135 R; 244/129.1; 361/218

(58) Field of Classification Search ................. 244/1 A, 244/1 R, 129.1, 133, 135 R, 135 B, 135 C, 244/136, 171.7, 129.2; 361/215, 218, 212; 220/562; 206/709

See application file for complete search history.

(56) References Cited

U.S. PATENT DOCUMENTS 4,225,899 A    9/1980    Sotiriou (Continued)

FOREIGN PATENT DOCUMENTS

EP    0 010 861 A1    5/1980

(Continued)

OTHER PUBLICATIONS

"Fundamentals of ESD, Part One—An Introduction to ESD", ESD Association, Jun. 2001 (11 pg.).

(Continued)

*Primary Examiner*—Tien Dinh
*Assistant Examiner*—Richard R Green
(74) *Attorney, Agent, or Firm*—Patterson Thuente Christensen Pedersen, P.A.

(57) ABSTRACT

Unsafe electric energies can exist in aircraft fuel tanks as a result of static build-up or induced currents from lightning strikes. The invention provides an aircraft having a ground circuit 19 and including a fuel tank having a fuel probe circuit having its own ground circuit. Multiple discharge paths allow the safe discharge of electricity from the tank before it reaches levels where an arc, spark or other electric discharge, able to ignite fuel in the tank, could occur. The discharge paths all pass via a conductive foam having a relatively high impedance that allow static bleed, but does not significantly increase the risk of currents induced by lightning reaching levels at which an ignition-causing electrical discharge might occur. The foam is securely bonded to both the aircraft ground circuit and the fuel probe ground, the bonds having a large area of surface-to-surface contact.

8 Claims, 2 Drawing Sheets

U.S. PATENT DOCUMENTS

| | | | |
|---|---|---|---|
| 4,259,865 A | | 4/1981 | Myers |
| 4,593,339 A | * | 6/1986 | Robinson .................... 361/215 |
| 4,602,310 A | | 7/1986 | Fenster |
| 5,097,703 A | * | 3/1992 | Peter ........................ 73/304 C |
| 5,159,523 A | | 10/1992 | Claassen et al. |
| 5,602,540 A | * | 2/1997 | Spillman, Jr. ............. 73/304 C |
| 5,835,322 A | | 11/1998 | Smith et al. |
| 5,929,744 A | * | 7/1999 | Duggal et al. ............. 338/22 R |
| 6,141,194 A | * | 10/2000 | Maier ......................... 361/58 |
| 6,278,381 B1 | * | 8/2001 | Bogert ....................... 340/945 |
| 6,320,118 B1 | * | 11/2001 | Pridham et al. ................ 174/2 |
| 6,600,972 B2 | * | 7/2003 | Morrison et al. ........... 700/286 |
| 2002/0101698 A1 | | 8/2002 | Bax |
| 2002/0193450 A1 | * | 12/2002 | Weiss et al. .................... 516/9 |
| 2003/0128493 A1 | * | 7/2003 | Nostrand ................... 361/118 |
| 2004/0011129 A1 | | 1/2004 | Gilmour et al. |

FOREIGN PATENT DOCUMENTS

| | | |
|---|---|---|
| EP | 0 248 122 A2 | 12/1987 |
| EP | 0 787 996 A1 | 8/1997 |
| EP | 0 976 653 A1 | 2/2000 |
| GB | 2 356 500 A | 5/2001 |

OTHER PUBLICATIONS

"Protektive PAK—Conductive Foam" (http://www.stanleysupplyservices.com/product-group/3042), prior to Aug. 5, 2004.

Botron Conductive Foam (http://esda.org/basics/part1.cfm), prior to Aug. 5, 2004.

Walker et al., "Preventing ignition sources inside fuel tanks," *FAST 33* (*Flight Airworthiness Support Technology*), (Dec. 2003).

* cited by examiner

FUEL TANK FOR AN AIRCRAFT

RELATED APPLICATIONS

The present application is a National Phase entry of PCT Application No. PCT/GB2005/003018, filed Aug. 2, 2005, which claims priority from, United Kingdom Application Number 0417473.6, filed Aug. 5, 2004, the disclosures of which are hereby incorporated by reference herein in their entirety.

TECHNICAL FIELD

The present invention relates to aircraft fuel tanks, and particularly but not exclusively, to aircraft fuel tanks made out of composite materials.

BACKGROUND OF THE INVENTION

During flight, undesirable electrical energy can build up in aircraft fuel tanks. This can be in the form of static electricity or electrical energies induced in the tank due to a lightning strike. If this energy is allowed to build to a great enough level then there exists a significant risk of an ignition event occurring in which the aircraft fuel, in particular fuel vapour, in the fuel tanks will ignite. It is thus desirable to limit the amount of electrical energy that is able to exist within the tank.

Fuel tanks of the prior art made of metal typically offer a certain amount of protection from lightning by virtue of the tank acting as a Faraday cage. However, composite fuel tanks do not afford such inherent protection. Such a disadvantage of composite fuel tanks can, to a limited extent, be mitigated by means of having a metallic mesh embedded within the composite structure. However, such measures provide little protection in the case of larger composite fuel tanks, where in-tank conductive components increase the risk of an ignition event resulting from lightning.

Fuel tank safety has over recent years been recognised as being particularly important in maintaining aircraft safety. Various regulations have been laid down by the relevant official bodies governing aircraft design. For example, the FAA (the US Federal Aviation Administration) has set various criteria for fuel tank design in aircraft in Special Federal Aviation Regulation (SFAR) No. 88. It is of course highly desirable for any modifications or improvements of fuel tank design to be compatible with (SFAR) No. 88 and/or any similar regulations in other countries or which supersede (SFAR) No. 88.

Due to the potentially catastrophic consequences, should an ignition event occur in an aircraft fuel tank, whatever means used for reducing the level of the risk on the level of electrical energy within the tank should ideally be highly reliable. It is desirable for example that these means should preferably be of a safety-critical nature. For example, the means should preferably be in the form of a fail-safe system.

One safety system of a fuel tank of the prior art simply comprises one or more discrete discharge paths from the fuel tank to the aircraft ground, in the form of grounding straps mechanically bonded to the tank and to the aircraft structure. Such straps are required to be routinely manually visually inspected to ensure that the local bonding points maintain good conductive contact. Such manual checks can only be performed when the aircraft is stationary and grounded and are not especially reliable.

The present invention seeks to provide a fuel tank with improved safety features and/or a fuel tank, which mitigates one or more of the problems or disadvantageous features of the prior art mentioned above and/or meets one or more of the above-mentioned criteria that it would be desirable to satisfy.

SUMMARY OF THE INVENTIONS

The present invention provides an aircraft comprising a fuel tank inside which there is provided at least one fuel measurement sensor, the fuel measurement sensor being connected to a control circuit via an electric signal carrying conductor, wherein the aircraft has a common ground circuit, the fuel measurement sensor and conductor are grounded to a separate ground circuit, the two ground circuits are connected by means of a high impedance discharge path, which facilitates the safe discharge of electricity from within the fuel tank, and the aircraft is so arranged that during flight there is no short-circuit between the two ground circuits.

The discharge path is preferably arranged to facilitate the discharge of electricity from within the tank. The discharge path may be arranged to facilitate the discharge of static electricity. The discharge path is preferably arranged to facilitate the discharge of electricity, for example electrical transients, induced by environmental conditions, such as for example lightning or radiation. Thus static electricity in the fuel tank is able to be discharged through the discharge path to the aircraft ground before it builds up to an unsafe level. Also, if the fuel tank is struck by lightning, electrical energy induced within the tank may be discharged through the discharge path to the aircraft ground. It will be appreciated that the risk of an ignition event being caused by currents induced by lightning can be reduced by insulating the in-tank conductive components, but that can increase the risk of static charge build-up becoming hazardous. Thus, the impedance of the discharge path should be high enough to reduce the maximum electrical discharge energy able to be induced in the tank by lightning to an acceptable level, but low enough to allow a flow of current sufficient to prevent static electricity from building up to a dangerous level.

The impedance between the two ground circuits may for example be greater than 5 k$\Omega$. The impedance may be less than 1 M$\Omega$. The two ground circuits may be electrically connected by means of a material having a volume resistivity of between 1 k$\Omega$m and 20 M$\Omega$m. The volume resistivity may be between 10 k$\Omega$m and 10 M$\Omega$m. The volume resistivity may be greater than 50 k$\Omega$m. The volume resistivity may be less than 1 M$\Omega$m.

The afore-mentioned material connecting the ground circuits conveniently forms substantially the entire length of the discharge path. The material is preferably connected to each ground circuit at a multiplicity of different spaced-apart regions securely in electrical contact with the respective ground circuit. Such a bonding arrangement is less prone to failure than for example a single bond location as is commonly used when bonding a grounding strap to ground.

The two ground circuits may be electrically connected by means of a conductive foam. The two ground circuits are preferably connected by material sandwiched between an inner box, in electrical contact with the fuel probe ground circuit, and an outer box, in electrical contact with the common aircraft ground circuit.

It will be understood that as a consequence of there being no short-circuit between the two ground circuits, there is no short circuit path from the fuel measurement sensor in the fuel tank to aircraft ground. Importantly, in certain embodiments of the invention, there is advantageously no low impedance path between the two ground circuits (i.e. there is advantageously no path between the two ground circuits having an impedance low enough to pose a risk of there being an unsafe electrical discharge as a result of lightning).

The impedance between the two ground circuits is preferably greater than a minimum value calculated in accordance with the following criteria:

(1) Total discharge from the control circuit associated with the fuel measurement sensor to the aircraft structure <200 μJ under fault condition, and (2) Total current under fault condition <30 mA.

The following table shows the calculated discharge energies in respect of various source impedances (the impedance between the two ground circuits), load impedances and various lengths of in-tank cable, the cable being positioned near the wall of a typical composite aircraft tank:

TABLE

Maximum Energy Discharges In Respect Of Cable Near Tank Wall

| Impedance | | Cable Length | | | | |
|---|---|---|---|---|---|---|
| Zsource | Zload | 1 m | 3 m | 5 m | 10 m | 20 m |
| Short circuit = cable impedance | Cable impedance | 63 mJ | 188 mJ | 314 mJ | 628 mJ | 1.25 J |
| Short circuit = cable impedance | 100Ω | 295 μJ | 2.6 mJ | 7.32 mJ | 30 mJ | 113 mJ |
| 10Ω | Matched | 741 μJ | 6.67 mJ | 18.5 mJ | 75 mJ | 296 mJ |
| 10Ω | 100Ω | 245 μJ | 2.2 mJ | 6 mJ | 24 mJ | 98 mJ |
| 100Ω | 100Ω | 74 μJ | 667 μJ | 1.85 mJ | 7.4 mJ | 29 mJ |
| 1 kΩ | 100Ω | 2.45 μJ | 22 μJ | 61 μJ | 245 μJ | 980 μJ |
| 10 kΩ | 100Ω | 29 nJ | 0.26 μJ | 0.7 μJ | 2.9 μJ | 11.6 μJ |

Thus, in respect of a fuel tank including a 10 m cable, and assuming a load impedance of 100Ω, if it is desired that the maximum possible discharge energy should be below 3 μJ, then the impedance between the ground circuits will need to be about 10 kΩ (equating to an energy of 2.9 μJ—see Table above) or greater.

The fuel tank may be so arranged that static electricity in the fuel tank is prevented from building up to a level where an unsafe electrical discharge might occur. Any event caused by flow of electricity that has the capacity to ignite fuel in the tank may be considered as an unsafe electrical discharge and, as such, high energy electrical arcs and sparks are both examples of unsafe electrical discharges.

The fuel tank may be so arranged that electricity induced by environmental conditions is limited so as to prevent an unsafe electrical discharge. FAA regulations, such as set out in Special Federal Aviation Regulation (SFAR) No. 88, require that the fuel tank be designed such that sparks or arcs with an energy greater than 200 μJ are prevented from occurring in the fuel tank. Thus, the discharge path is conveniently arranged to allow the discharge of electricity, whilst not creating any non-negligible risk of a spark or arc having an energy greater than 200 μJ occurring. Provided that the discharge path meets this requirement it can be considered as providing for the safe discharge of electricity. Thus, the term "unsafe electrical discharge" may exclude discharges having energies less than 200 μJ.

There may be at least two separate and distinct discharge paths for the safe discharge of electricity from the fuel tank. Thus, if one of the discharge paths should fail then at least one other discharge path will still provide for the safe discharge of electricity from the tank. There may also be a conductive strap connected between the fuel tank and a part of the aircraft securely electrically connected to the aircraft ground circuit. Preferably, said at least two discharge paths have separate bond points to a part of the aircraft that is securely and reliably in conductive communication with the aircraft electrical ground. There may be a multiplicity of separate discharge paths, for example being defined by means of separate paths through bulk material. (It will be understood that such bulk material would not be in the form of wires or straps).

The or each fuel measurement sensor is preferably in the form of a probe from which an electronic signal dependent on a measurable characteristic of fuel in the tank can be derived. The measurable characteristic may for example be the level of fuel in the tank, the density of fuel in the tank, the temperature of fuel in the tank or any other characteristic that it might be useful to measure. Thus the fuel measurement sensor may be in the form of a capacitance probe. The use of such capacitance probes is well known in the art of aircraft fuel measurement systems. The fuel measurement sensor may be in the form of a temperature sensor. The fuel measurement sensor may be in the form of a densitometer. The conductive parts of the fuel measurement sensor may be electrically isolated from the main structural walls that define the fuel tank. At least some of the electrically conducting parts of the fuel measurement sensor are electrically insulated from direct contact with fuel in the fuel tank. The fuel measurement sensor may include wiring leading from the main body of the sensor out of the tank. Insulating or otherwise isolating the fuel measurement sensor may reduce the risk of unsafe electrical discharges resulting from lightning, but may also increase the likelihood of static electricity build-up in the tank.

The electric signal carrying conductor may conveniently be elongate in shape. The electric signal carrying conductor may for example be in the form of one or more wires. The in-tank wiring leading from the fuel measurement sensor may be longer than 2 meters. The wiring may be longer than 3 meters. In large aircraft, having relatively long fuel tanks, the wiring may be longer than 4 meters or may be 5 meters or longer. Wiring may typically be any length from 1 m to 20 m. The electric signal carrying conductor may have a length in accordance with any of the afore-mentioned length criteria whether or not it is in the form of wiring. There may also be other wires within the tank. All conductive wires and the like within the fuel tank may collectively be referred to as the in-tank wiring.

The present invention has particular application when the fuel tank is mostly non-metallic. For example, greater than 50% by volume of the tank may be non-metallic. The fuel tank may for example be in the form of a tank made mostly from composite fibre material, for example carbon fibre based composite material. The fuel tank structure may therefore have relatively high impedance compared to a metallic fuel tank. As such, the fuel tank may be more susceptible, if suitable measures (such as implementing the present invention) are not taken, to unsafe electrical discharges caused by lightning. The fuel tank, whilst being mostly non-metallic, may be provided with a Faraday cage structure, which may for example be in the form of a metallic mesh embedded within the composite fibre structure that defines the fuel tank.

Preferably, the control circuit is so arranged that it is supplied by electrical power that may be considered as being effectively electrically isolated. For example, light may be converted into electrical power in a region local to the fuel tank. Preferably the control circuit is so arranged that an output of the control circuit may be considered as being effectively electrically isolated. For example, the control circuit may have an optical output. For example, electrical outputs may be converted into light signals in a region local to the fuel tank. Thus, electric signals and the associated cables may be located only in a region local to the fuel tank. It is preferable in particular that optical fibre cables carry signals from the control circuit. Such optical cables may link the control circuit to a central fuel quantity measurement system of the aircraft.

The control circuit may be local to the fuel tank. The control circuit may be housed in an enclosure, the enclosure being attached to the aircraft structure. The enclosure may be in the form of a dedicated housing, for example a box. The control circuit enclosure may be made from conductive material, for example metal. Preferably, the control circuit enclosure is connected to a wall of the fuel tank. In the case of a carbon fibre tank, the control circuit enclosure may be connected to a lightning deflection conductor on the tank. The control circuit enclosure may be grounded, preferably to the aircraft ground. The circuit enclosure is preferably attached directly to the fuel tank wall, there being conductive contact therebetween. Preferably, there is a conductive strap from the fuel tank to the control circuit enclosure. The or each discharge path may be arranged to conduct electricity via the circuit enclosure to the aircraft ground.

The fuel tank may be arranged such that the maximum energy able to be produced in an electrical discharge in the tank is less than 200 µJ. For example, the impedance between the two ground circuits may be high enough to ensure that the maximum energy able to be produced in an electrical discharge in the tank is less than 200 µJ. It is desirable for the maximum energy able to be produced in an electrical discharge to be lower if achievable. It is preferable that the fuel tank is arranged such that the maximum energy able to be produced in a discharge is less than 50 µJ. For example, the impedance between the two ground circuits may be high enough to ensure that the maximum energy able to be produced in an electrical discharge in the tank is less than 50 µJ. More preferably the fuel tank is arranged such that the maximum energy able to be produced in a discharge is less than 20 µJ.

The fuel tank may be arranged such that under fault conditions the maximum current possible in the tank is less than 30 mA. Preferably the fuel tank is arranged such that the maximum current used in the tank is less than 10 mA. Even more preferably the fuel tank is arranged such that the maximum current used in the fuel tank is about 1 mA or less. The fuel tank may also be arranged such that there is also a limit on currents introduced into the tank by means other than those necessary for the aircraft to operate. For example, currents may be induced during lightning strikes and it is preferred that the fuel tank design limits the amounts of those induced currents.

The control circuit may be in the form of, or comprise, a fuel level measuring circuit. The measuring circuit preferably includes a signal generator and a signal receiver, for sending signals between the measuring circuit and the fuel measurement sensor. The signal generator and signal receiver may be located local to the fuel tank for example in an enclosure, for example a metal box.

According to the invention there is also provided a fuel tank for an aircraft, inside the tank there being provided a fuel measurement sensor, the fuel measurement sensor being connected to an electric signal carrying conductor to facilitate connection to a control circuit, wherein the fuel measurement sensor and conductor are grounded to a common line and the common line includes a high impedance discharge path for connection to the common ground circuit of an aircraft, the discharge path thus facilitating the safe discharge of electricity from within the fuel tank. The fuel tank, when installed in an aircraft, is preferably so arranged that during use there is no short-circuit between the common line, which line may be considered as forming a separate ground circuit, and the aircraft ground circuit. The fuel tank may be provided with a control circuit, which is connected to the fuel measurement sensor via the electric signal carrying conductor.

The invention also provides a kit of parts for converting an existing aircraft into an aircraft according to any aspect of the present invention. Preferably, the kit comprises a component for forming the high impedance discharge path. The component may be in the form of, or comprise, a conductive foam. The kit may also comprise a control circuit including the features as required by any aspect of the invention described herein. The kit may also comprise an electric signal carrying conductor or a fuel measurement sensor, for example including the features as required by any aspect of the invention described herein. The control circuit may be housed in an enclosure, for example a box, for mounting next to, or more preferably in contact with, a fuel tank of an aircraft. The control circuit preferably includes at least a part of the discharge path, for example a part having a relatively high impedance.

It will of course be appreciated that features described in relation to one aspect of the invention may, where appropriate, be incorporated into another aspect of the invention. For example, features described in relation to the fuel tank of the aircraft of the invention may be incorporated into the aircraft fuel tank of the invention.

BRIEF DESCRIPTION OF THE DRAWINGS

An embodiment of the present invention will now be described by way of example with reference to the accompanying schematic drawings of which.

DETAILED DESCRIPTION

Figure 1:
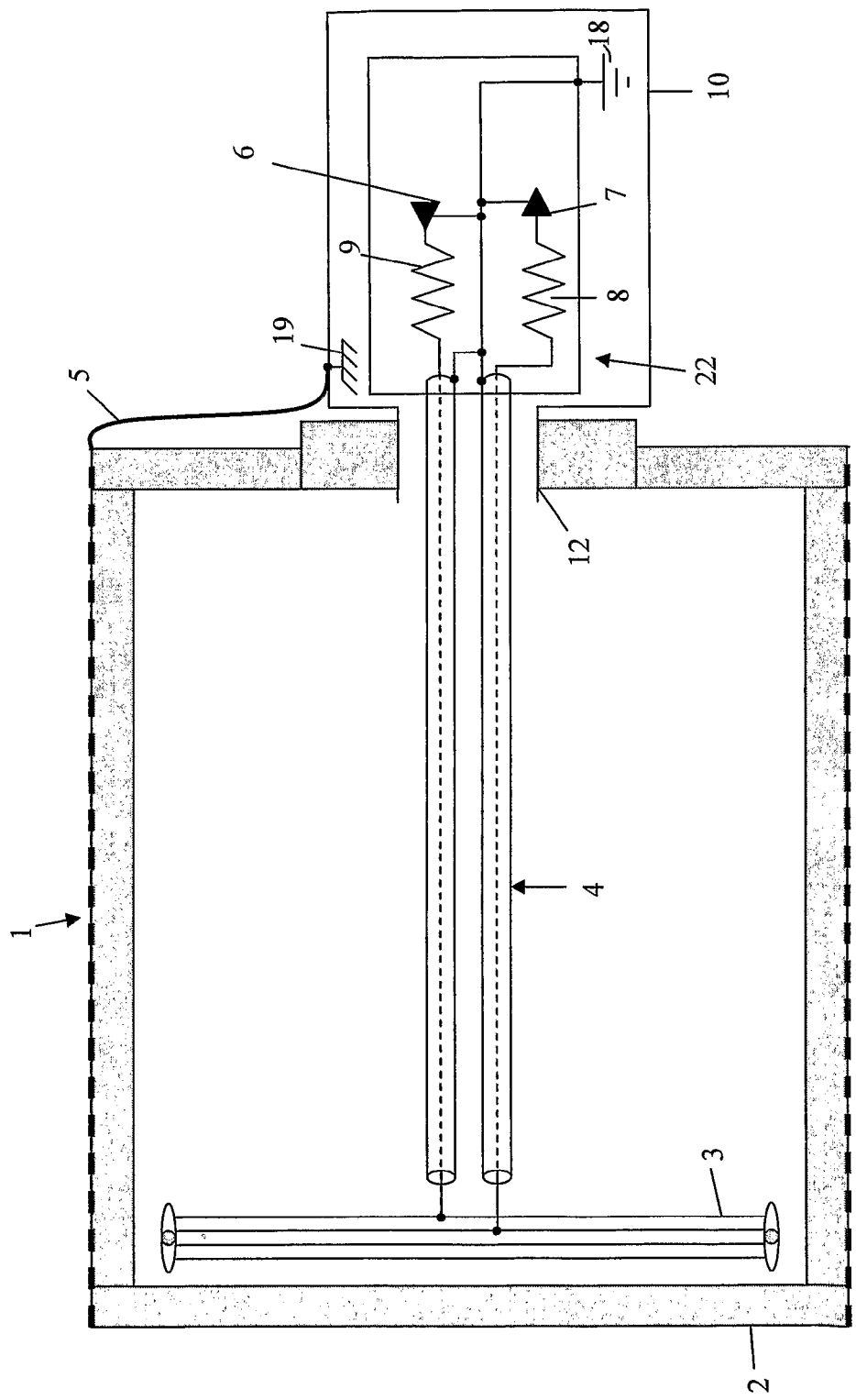
FIG. 1 shows a fuel probe, a fuel tank and a control circuit, according to a first embodiment of the invention.

FIG. 1 shows a carbon fibre reinforced composite material fuel tank 1 formed in an aircraft wing of a first embodiment of the present invention. The tank, being defined by the shape of the wing-box in a region covering several ribs in the wing, has a complex geometry, but is about 5 meters in length in the spanwise direction. The composite material defining the space in which fuel may be held in the fuel tank includes a fine metallic mesh 1a embedded therein which thus provides a metallic cage around the fuel, which forms a Faraday cage structure offering some protection against the induction of currents in the fuel tank from environmental conditions such as lightning.

Inside the tank 1 there are provided many fuel probes 3 (only one of which is shown in FIG. 1) and a control circuit comprising a circuit 22 for measuring the level of fuel present in the tank 1. The fuel probes are each positioned at different locations within the tank 1. The fuel probes comprise fuel level probes, thermometers and densitometers, as is standard practice in certain aircraft fuel tanks. The illustrated fuel probe is in the form of an insulated capacitance probe 3 comprising two concentric conductive tubes. The capacitance probes 3 are connected to the same fuel measuring circuit 22 which is housed in a metal circuit box 10 attached to, but positioned predominantly outside the fuel tank 1. (The fuel measuring circuit 22 may therefore be considered as a tank wall processor.) Each capacitance probe 3 is connected to the circuit 22 via two isolated wires 4 which are effectively substantially electrically insulated from the surrounding fuel except at the probe terminals (the probe terminals typically being in the fuel). Insulation from the fuel is not necessary to ensure correct operation or safety as the fuel is a poor conductor, but rather to reduce the potential for unsafe electrical discharge resulting from induced currents. (Although both wires 4 are shown as shielded, it will be appreciated that one of the wires could be shielded, with the other wire not being shielded.)

The fuel measuring circuit 22 also includes a signal generator 6, a signal receiver 7 and two resistors 8 and 9. The fuel measuring circuit 22 is powered by a safe isolated electrical source including an a.c. transformer (not shown), which outputs approximately 1 W electrical power. During operation, an a.c. wave signal having a peak current of about 1 mA is generated in the signal generator 6 and sent through a first resistor 9 down through the in-tank wiring 4 to each respective capacitance probe 3. All of the probes 3 in the tank are excited in this manner by a common signal source. The signal receiver includes a circuit to compare the returned signal with the reference signal the ratio of which is proportional to the change in probe capacitance and therefore proportional to the level of fuel in the tank.

The signals from the respective capacitance probes are multiplexed to allow separation of the returned signals. These electrical signals in the signal receiver are converted into multiplexed optical output signals that are transmitted via fibre optic cable (not shown) to a central fuel quantity measurement system (not shown).

The central fuel quantity measurement system receives multiplexed signals from the signal measuring circuit associated with each respective fuel tank of the aircraft. In respect of each tank, the fuel quantity measurement system processes the received signals to ascertain the individual fuel levels measured by the probes and then calculates the amount of fuel in the tank.

The fuel probe 3, its associated in-tank wiring 4 and the fuel measuring circuitry 22 are considered as being effectively isolated from the fuel tank structure (its walls 2) and the circuit box 10. As can be seen in FIG. 1, there is a conductive strap 5 from the fuel tank wall 2 to the metal circuit box 10 and the metal circuit box is also connected to the tank walls 2 at the point where there is an aperture 12 in the walls to allow the in-tank circuitry 4 to connect to the capacitance probe 3. The metal circuit box 10 is connected directly to the aircraft ground circuit. Thus, the tank walls 2 are also connected directly to the aircraft ground circuit. The insulation on the in-tank wiring 4 and the fuel measuring circuit is grounded to a separate common ground 18 (hereinafter referred to as the tank circuit ground 18) distinct from the aircraft ground 19.

The wires 4 from the probes 3 in the tank 1 to the circuit box 10 range in length (up to a typical maximum of 5 meters, but perhaps as long as 20 m in some cases) depending on the position of the probe concerned and tank configuration. As the length of the in-tank wiring increases so does the maximum energy of likely electrical discharges arising from lightning strikes. At such lengths, it is important that there is no low impedance path between the in-tank wiring and the aircraft ground, as any such low impedance path would increase the risk of unsafe electrical discharges occurring in the tank.

By increasing the impedance between the in-tank wiring and the aircraft ground the maximum energy likely to be discharged in a hazardous manner in the tank resulting from currents induced by lightning may be reduced. However, if the in-tank wiring is completely isolated from the aircraft ground there would be a significant increase in the risk of static electricity building up to a level at which an unsafe electrical discharge of static electricity is possible.

To provide adequate protection against unsafe electrical discharges arising in the fuel tank as a result either of static build-up or as a result of electrical transients resulting from lightning passive protection means, comprising a conductive foam, is provided, as is explained in further detail below.

Figure 2:
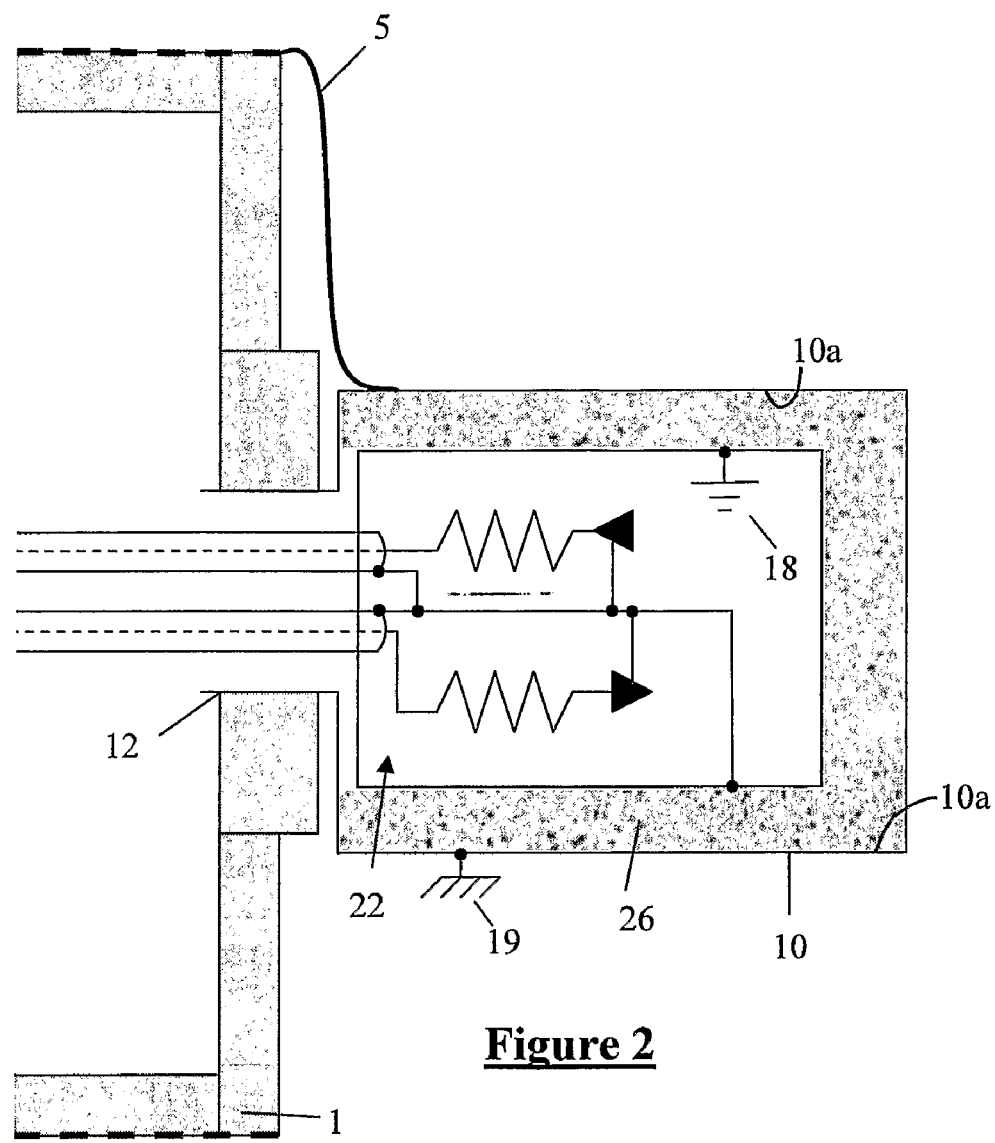
FIG. 2 shows a part of the fuel probe and fuel tank of FIG. 1 together with a more detailed illustration of the control circuit.

FIG. 2 shows schematically a section of the fuel tank 1 shown in FIG. 1 with the fuel measuring circuit 22 attached to the fuel tank 1. The circuit 22 has its own ground circuit, represented schematically in FIG. 2 by ground symbol 18 in FIG. 2. The metal circuit box 10 in which the fuel measuring circuit 22 is housed is connected to the aircraft ground 19 by means of being connected directly to a part of the aircraft structure that is securely in electrical communication with aircraft ground. There is a high impedance conductive path between the separate tank circuit ground 18 and the aircraft ground 19, the high impedance discharge path being provided by means of a conductive foam 26, which provides a reliable and secure high impedance path between the circuit ground 18 and the aircraft ground 19. Thus, the conductive foam 26 contacts both the isolated ground 18 of the in-tank circuitry and also the interior surface 10$a$ of the circuit box 10 over a relatively large surface area thus providing many spaced apart regions of conductive contact. The foam 26 is also sufficiently flexible to flex in the event of relative movement between the in-tank circuitry 22 and the circuit box 10 (for example, as a result of thermal expansion, vibration or the like).

The conductive foam 26 is made from a foam which can withstand the typical temperature variations on a wing (−55° C. to +125° C.) and is impregnated with a substance to provide a volume resistivity of 100 k$\Omega$m and a surface resistivity of 50 $\Omega/m^2$. The impedance between the in-tank circuitry ground 18 and the aircraft ground 19 is about 10 k$\Omega$. Thus the conductive foam 26 provides a multiplicity of highly reliable and secure discharge paths between the in-tank circuitry ground 18 and the aircraft ground 19, which facilitate the discharge of static electricity, whilst not significantly increasing the risk of dangerous electrical transient currents being induced within the tank as a result of lightning or other electrical environmental activity.

Whilst the present invention has been described and illustrated with reference to a particular embodiment, it will be appreciated by those of ordinary skill in the art that the invention lends itself to many different variations not specifically illustrated herein. By way of example, the fuel tank could be metallic, as opposed to being formed of composite material.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft comprising a fuel tank, wherein
   inside the fuel tank there is provided at least one fuel measurement sensor, the fuel measurement sensor being connected to a control circuit via an electric signal carrying conductor,
   the aircraft including an inner conductive box in which the control circuit is housed, the inner conductive box being mounted inside an outer conductive box, there being conductive material sandwiched between the inner conductive and outer conductive boxes providing a conductive connection therebetween, the conductive connection therebetween having an impedance of greater than 5 KOhm and less than 1 MOhm,
   the inner conductive box and outer conductive box being located external to the fuel tank,
   at least one of the fuel measurement sensor and conductor are grounded to the inner conductive box,
   the aircraft having a common ground circuit, the outer conductive box being connected to the common ground circuit to facilitate the safe discharge of electricity from within the fuel tank via the inner conductive box,
   the aircraft being so arranged that during flight there is no short-circuit between the inner conductive box and the common ground circuit.

2. An aircraft as claimed in claim 1, wherein said conductive material has a volume resistivity of between 10 kΩm and 10 MΩm.

3. An aircraft as claimed in claim 1, wherein said conductive material is in the form of conductive foam material.

4. An aircraft as claimed in claim 1, wherein the electric signal carrying conductor is elongate and has a length of greater than 3 meters.

5. An aircraft as claimed in claim 1, wherein said inner conductive box being local to a wall of the fuel tank and being grounded by being electrically connected to the aircraft ground.

6. An aircraft as claimed in claim 1, wherein the fuel tank structure is more than 50% by volume non-metallic.

7. An aircraft as claimed in claim 1, wherein the fuel tank is arranged such that under fault conditions the maximum current possible in the tank is less than 30 mA.

8. An aircraft as claimed in claim 1, wherein the fuel tank is arranged such that the maximum current used in the tank is less than 10 mA.

* * * * *